Figure 1:
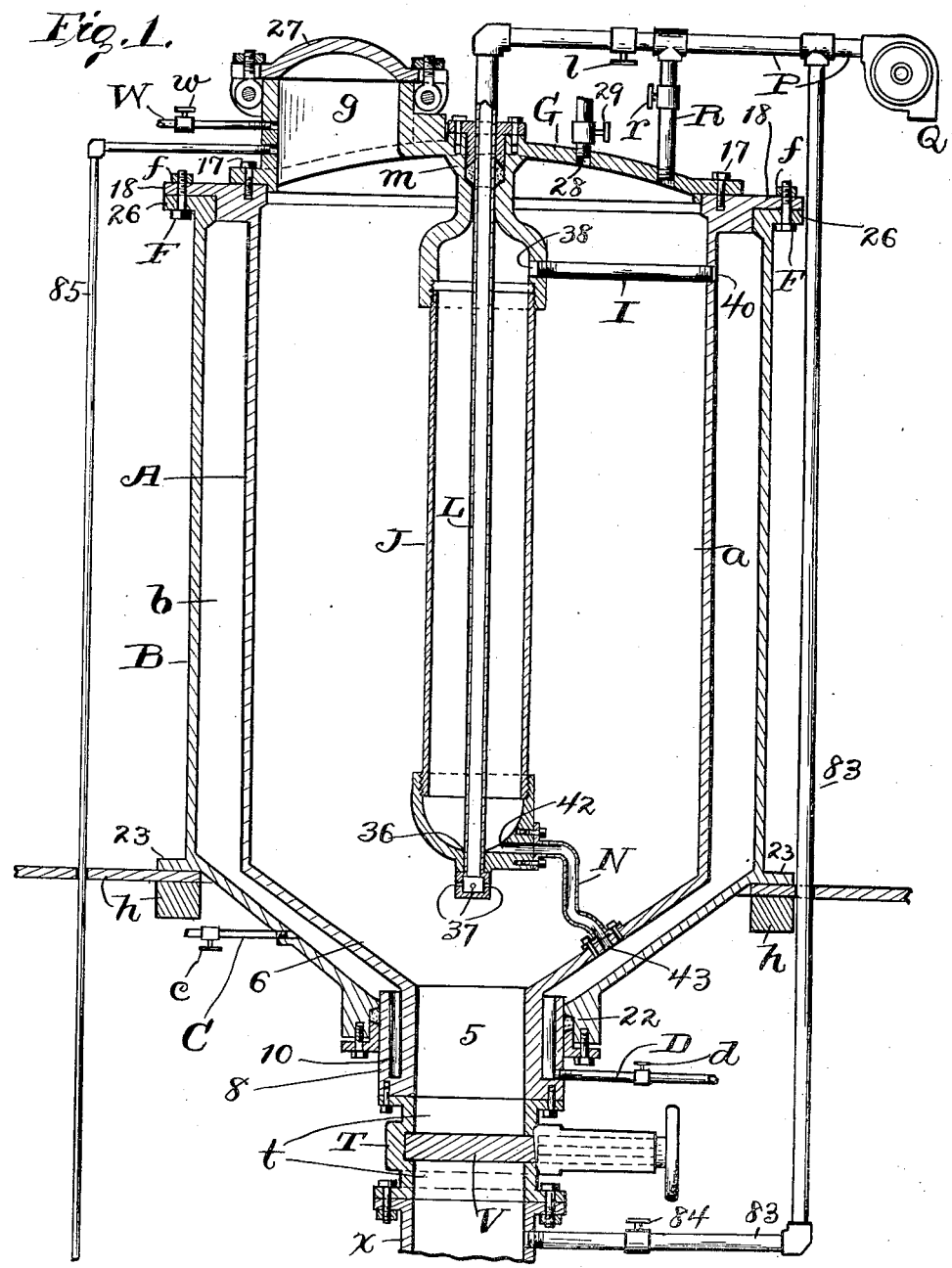

No. 829,954. PATENTED SEPT. 4, 1906.
E. R. EDSON.
PROCESS OF REDUCING GARBAGE AND SEWAGE.
APPLICATION FILED MAY 28, 1904.

3 SHEETS—SHEET 1.

WITNESSES:
Daniel E. Daly
Victor C. Lynch

INVENTOR
Eugene R. Edson
BY
Lynch & Dorer
his ATTORNEYS

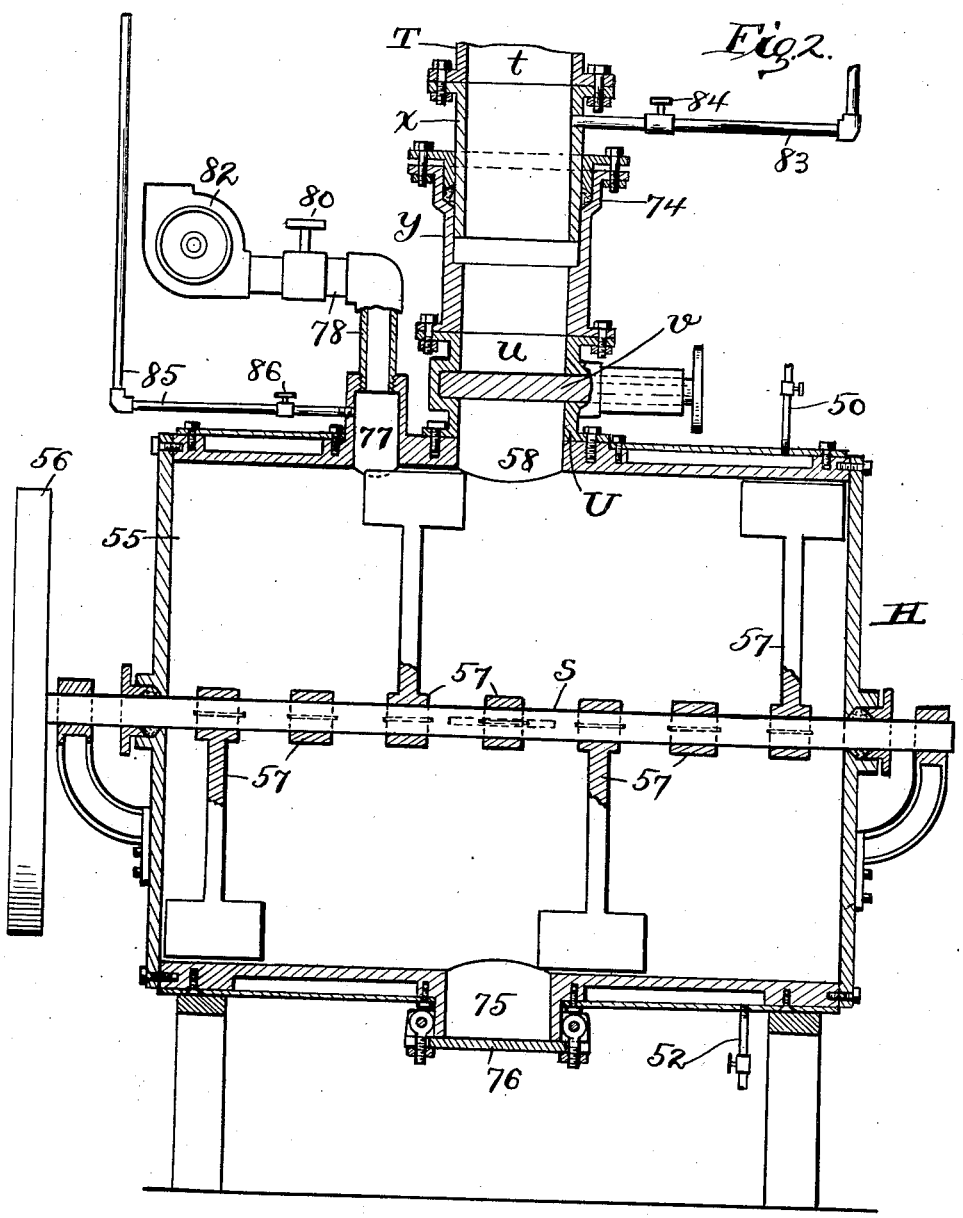

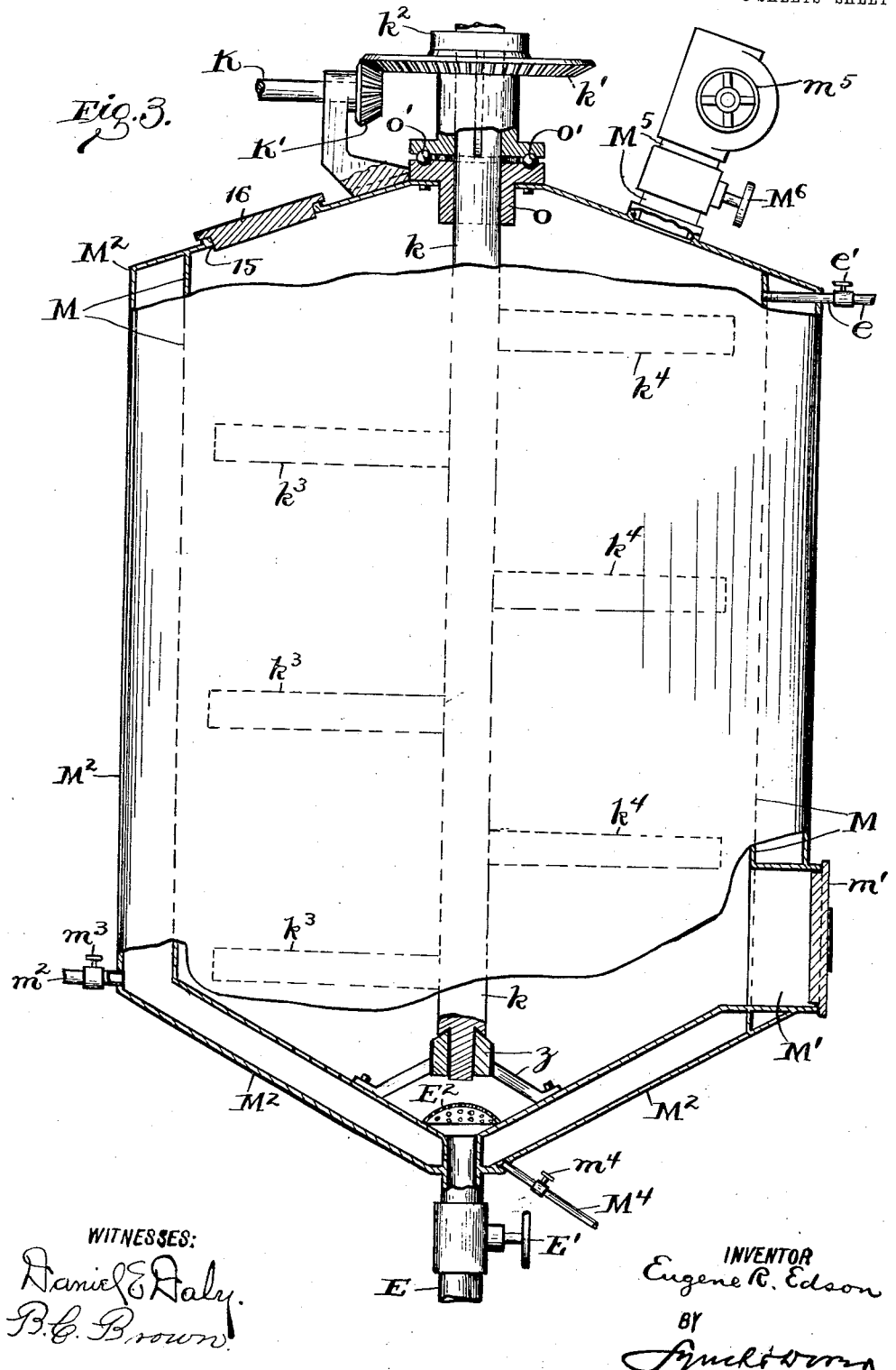

UNITED STATES PATENT OFFICE.

EUGENE RILEY EDSON, OF CLEVELAND, OHIO.

PROCESS OF REDUCING GARBAGE AND SEWAGE.

No. 829,954.     Specification of Letters Patent.     Patented Sept. 4, 1906.

Application filed May 28, 1904. Serial No. 210,196.

*To all whom it may concern:*

Be it known that I, EUGENE RILEY EDSON, a citizen of the United States of America, residing at Cleveland, in the county of Cuyahoga and State of Ohio, have invented certain new and useful Improved Processes of Reducing Garbage and Sewage; and I hereby declare the following to be a full, clear, and exact description of the invention, such as will enable others skilled in the art to which it pertains to make and use the same.

This invention relates to an improved process of reducing garbage and sewage.

One object of this invention is to so treat garbage and sewage that the material is thoroughly cooked or digested and disintegrated without ebullition that substantially all of the oily or greasy matter contained in the mass is rendered free to be separated from the remainder of the mass by percolation after rendering the cooked or digested mass substantially non-aqueous and that the residue is left in the most desirable condition for use as a fertilizer.

Another object of this invention is to reduce garbage and sewage with facility and inexpensively.

With these objects in view my invention preferably consists in the reduction of garbage or sewage by cooking or digesting the material in a closed receptacle heated by steam under a gage-pressure of about sixty pounds per square inch for a period of from eight to ten hours and under a pneumatic pressure of seventy pounds or more per square inch, and thereby prevent the liberation or separation of free ammonia from the nitrogenous material being treated and prevent also a vaporizing of glycerin.

The accompanying drawings illustrate apparatus suitable for use in carrying out my improved process, and referring to the said drawings, Figure 1 is a side elevation, largely in central section, of the upper portion of apparatus, including the digester, and the upper portion of the valved passage-way provided for conducting cooked or digested garbage or sewage from the digester into the drying-chamber of a drier. Fig. 2 is a side elevation, largely in central section, of the lower portion of the said apparatus, including the drier and the lower portion of the aforesaid passage-way. Fig. 3 is a side elevation, partly in section, of a percolator employed in extracting oil from the material removed from the drier. Portions are broken away in the drawings to reduce the size of the drawings.

Apparatus suitable for use in carrying out my improved process comprises a digester illustrated in Fig. 1 of the drawings, and referring to this figure, A designates a cylindrical upright metallic receptacle in which garbage or sewage which is to be reduced is cooked or digested. The receptacle A is shaped at its lower end to form a downwardly-discharging opening or outlet 5 for the chamber $a$ of the receptacle, which outlet has an upwardly-flaring mouth 6.

The receptacle A forms also the inner side wall of the chamber $b$ of the steam-jacket of the receptacle. The outer side wall of the jacket-chamber $b$ is formed by an outer metal shell B, which of course extends around the receptacle A and is enough larger than the said receptacle to form the chamber $b$. The shell B is provided at its lower end with a suitably-applied stuffing-box 22, which surrounds the surrounding wall 8 of the outlet 5 of the digester and forms a fluid-tight joint around the said wall, and the chamber 10, which is formed in the upper portion of the said wall, is open at its upper end and communicates with and forms a downward extension of the jacket-chamber $b$. A drainpipe D communicates with the chamber 10, and is provided with a normally closed valve $d$. The shell B is provided also with a steam-pipe C, which communicates with the chamber $b$ and is employed to conduct steam into the said chamber. The pipe C is provided with a valve $c$.

A head G is instrumental in closing the upper end of the chamber $a$ and rests upon the upper end of the receptacle A. The head G is removably secured to the receptacle A by bolts or screws 17. The joint between the head G and the receptacle A is rendered fluid-tight in any approved manner.

The lower portion of the jacket-forming shell B is provided externally with an annular flange 23, arranged to rest upon the framework or structure $h$, from which the digester is supported. The shell B is provided at its upper end and externally with an annular flange 26. The receptacle A is suspended from the upper end of the jacket-forming shell B and provided at its upper end and externally with an annular flange 18, which rests upon the upper end of the said jacket-forming shell and extends over the flange 26 of the said shell, to which flange the receptacle A is shown removably secured by bolts F and nuts *f*. The bolts F extend through the flanges 18 and 26 and are arranged with their heads at the under side of the flange 26, and the nuts *f* are mounted upon the shanks of the bolts at the upper side of the flange 18.

The head G consists in the main of an iron casting. A heating-drum J, which is arranged vertically and centrally of the chamber *a*, is suspended from the said head.

An air-conducting pipe L is arranged centrally of and extends longitudinally through the drum J and through the head G, snugly fitting and extending through the hole 36, which is formed in and centrally of the lower head of the drum. The pipe L is provided below the drum J with laterally-discharging orifices or outlets 37. The joints formed where the pipe L extends through the head G and through the lower head of the drum J are rendered fluid-tight in any approved manner. For instance, the pipe L extends through a stuffing-box *m* with which the head G is provided. The pipe L is provided above the head G with a normally closed valve *l*. The head G is provided also with an air-conducting pipe R, which discharges into the chamber *a* at the top of the said chamber and is provided with a normally closed valve *r*. The pipes L and R are connected and communicate with an air-supply pipe P in common. The pipe P communicates with the outlet of a suitably-operated and suitably-supported air-pump Q, whose inlet is in communication with the external atmosphere.

The head G is provided at one side of the drum J with an upwardly-flanged charging-aperture *g*, through which the garbage or sewage which is to be reduced is fed to the chamber *a*, and a suitably-applied cover 27 is employed for closing the said aperture. The aperture *g* is large enough transversely to serve as a manhole.

A water-supply pipe W, which is provided with a normally closed valve *w*, communicates with the chamber *a* at the upper end of the said chamber.

The upper portion of the drum J is provided with a lateral port 38, which communicates with the chamber of the drum J, and the surrounding wall of the chamber *a* is provided opposite the port 38 with a port 40, which communicates with the jacket-chamber *b*. A suitably-applied pipe I establishes communication between the ports 38 and 40. The drum J is provided at the bottom with a port 42, and the surrounding wall of the mouth 6 of the outlet 5 of the receptacle A is provided a suitable distance below the said port with a port 43, which communicates with the jacket-chamber *b*, and a sinuous copper pipe N, suitably attached to the said drum and to the said receptacle, is arranged to establish communication between the ports 42 and 43.

A valve-casing T is arranged below the outlet 5 of the digester, with the chamber *t* of the valve-casing communicating at the upper end of the valve-casing with the said outlet. The valve-casing T is secured at its upper end to the digester. The valve-casing T is provided with a slide-valve V, which controls the discharge of material through the valve-casing chamber *t* from the outlet 5 of the digester.

A suitable distance below the digester is arranged a drier, which, as shown in Fig. 2, comprises a steam-jacketed receptacle. A valved steam-pipe 50 and a valved drain-pipe 52 communicates with the chamber of the steam-jacket of the drier at the top and bottom, respectively, of the drier. A shaft *s* is arranged centrally of the drying-chamber 55 of the drier and extends horizontally through the said chamber. The shaft *s* is supported from the end walls of the chamber 55 and is provided exteriorly of the said chamber with a driving-wheel 56, to which power is applied in any approved manner. The shaft *s* is provided within the drying-chamber with radial arms 57, instrumental in stirring material treated within the said chamber during the operation of the shaft. The top wall of the drying-chamber is provided vertically below the outlet 5 of the digester with a charging-aperture 58, through which the material which is to be rendered substantially non-aqueous within the drier is fed to the said chamber.

A valve-casing U rests upon the drier around the aperture 58 and is secured at its lower end to the drier. The chamber *u* of the valve-casing U communicates at the lower end of the valve-casing with the aperture 58. The valve-casing U is provided with a slide-valve *v*, which controls the passage of material through the valve-casing chamber *u* to the drying-chamber 55.

Two telescoping pipes *x* and *y* are arranged between and directly communicate with the chamber of and are secured to the different valve-casings T and U, respectively. The upper pipe *x* is secured at its upper end to the lower end of the upper valve-casing T. The lower pipe *y* is secured at its lower end to the lower valve-casing U. The upper pipe *x* extends into the lower pipe *y*, and the arrangement of the parts is such that the two pipes *x* and *y* are capable of elongating or contracting endwise independently of each other. The lower pipe *y* is provided at its upper end and around the upper pipe *x* with a stuffing-box 74. The joint between the upper valve-casing T and the digester, the joint between the lower valve-casing *y* and the drier, and the joints between the valve-casings T and U, and the pipes $x$ and $y$, respectively, are rendered fluid-tight in any approved manner.

The drying-chamber 55 is provided at the bottom with a discharge opening or outlet 75, through which the material rendered substantially non-aqueous within the said chamber is removed from the drier. The outlet 75 is normally closed by a suitably-applied door 76.

The drying-chamber 55 is also provided at the top with a vapor-outlet 77 at which the aqueous vapor arising from material dried in the drier is permitted to escape from the said chamber. A vapor-conducting pipe 78, which is provided with a valve 80, communicates at one end with the vapor-outlet 77 and is in communication at its opposite end with a suitably-operated and suitably supported pump or suction-creating device 82.

An air-conducting pipe 83 communicates at one end with the passage-way formed by the pipes $x$ and $y$ and is shown suitably attached to the upper pipe-section $x$. The pipe 83 is provided with a valve 84 and communicates at its opposite end with the pipe P.

An air-conducting pipe 85 communicates at one end with the vapor-outlet 77 of the drying-chamber and is in communication at its opposite end with the chamber $a$ of the digester at the upper end of the said chamber. The pipe 85 is supplied with a normally closed valve 86.

In practicing my improved process the garbage or sewage which is to be reduced is introduced into the chamber $a$ of the digester through the charging-aperture $g$ upon opening the cover 27, which is thereupon closed. If the material does not contain enough moisture to facilitate disintegration of the same, the valve $w$ of the water-supply pipe W is opened to supply the desired additional quantity of moisture to the material, and thereupon the said valve is closed. The garbage or sewage when supplied to the chamber $a$ of the digester is kept in a quiet state within the said chamber, and consequently before any heating of the said material within the said chamber an adequate pneumatic pressure is established on top of the mass in the said chamber upon operating the pump Q after opening the valve $r$ of the pipe R. When a pneumatic pressure of at least ten pounds per square inch greater than the steam-pressure to be employed in heating the digester obtains on the mass within the chamber $a$ the valve $r$ is closed and steam is admitted to the jacket-chamber $b$ upon opening the valve $c$ of the steam-pipe C. Steam under a gage-pressure of over forty pounds per square inch is essential. Preferably steam under a gage-pressure of sixty pounds per square inch is employed in heating the digester and contents, and preferably a pneumatic pressure of from seventy-five to eighty pounds per square inch is established upon the mass within the chamber $a$ of the digester before the heating of the material so as not only to prevent or at least materially retard corrosion of the digester preparatory to as well as during the cooking or digesting of the nitrogenous material, but to facilitate the liberation of substantially every particle of grease from the material, to render the disintegration of the material rapid, to avoid the liberation or separation of free ammonia from the material, and to prevent vaporizing of glycerin. It will be observed, therefore, that the material is cooked or digested for a period of from eight to ten hours at a temperature of at least 285° Fahrenheit and preferably at a temperature of over 300° Fahrenheit, under a pneumatic pressure of from seventy-five to eighty pounds per square inch to insure an adequate disintegration of the material and a thorough liberation of oily and greasy matter contained in the mass without a separation of ammonia from the nitrogenous material and without permitting a vaporizing of glycerin.

As already indicated, the primary object of this invention is to separate substantially every particle of grease from the material to be reduced and to leave the residue in the most desirable condition for use as a fertilizer.

By my improved process the freeing of vapors within the digester is practically avoided, and consequently vapors carrying more or less ammonia are prevented from ascending or separating from the nitrogenous material during the treatment of the said material, and I remark also that preventing the separation of glycerin from the oily and greasy matter contained in the mass is important because a greater percentage of glycerin in the grease extracted from the material renders the grease more valuable.

I would remark also that in heating the digester by steam under a gage-pressure of sixty pounds per square inch glycerin would vaporize and escape from the oily and greasy matter to be separated from the remainder of the mass in the absence of the maintenance upon the mass of a pneumatic pressure of at least ten pounds per square inch more than the steam-pressure employed; but by employing a pressure of from seventy-five to eighty pounds per square inch on top of the mass in the digester vaporizing of glycerin within the digester is successfully prevented.

I would remark also that in cooking or digesting garbage or sewage within a closed steam-heated receptacle at a temperature at least 300° Fahrenheit under a pneumatic pressure of from seventy-five to eighty pounds per square inch on top of the mass for a period of from eight to ten hours substantially every trace of oily and greasy matter in the material is liberated sufficiently to render substantially all of the grease readily separable from the remainder of the mass by percolation after rendering the grease-bearing digested mass substantially non-aqueous.

To facilitate the disintegration of the material during the cooking or digesting of the material within the digester, air under pressure may be admitted into the lower portion of the mass through the pipe L by temporarily operating the air-pump Q and opening the valve $l$. Any excess of air-pressure within the digester can be relieved upon temporarily opening the valve 29 of the air-outlet 28.

To positively prevent leakage through the valve-casing T into the passage-way formed by the telescoping pipes $x$ and $y$ and to prevent the air-pressure maintained on top of the mass within the digester from adding to the load upon the valve V, the valve 84 of the pipe 83 is opened and the pump Q operated to pump air into the said passage-way until the pneumatic pressure within the said passage-way equals the pneumatic pressure upon the mass within the digester, and the desired pneumatic pressure in the said passage-way is established preparatory to and maintained during the cooking or digesting of the material.

When the garbage or sewage undergoing treatment within the digester has been adequately digested—say for a period of at least eight hours at the temperature and under the pneumatic pressure hereinbefore stated—the valves V and $v$ are opened to permit a downward passage of the digested material from the chamber $a$ of the digester through the passage-way formed by the outlet of the digester, the valve-casing chamber $t$, the pipes $x$ and $y$, the valve-casing chamber $u$, and the charging-aperture 58 of the drying-chamber 55 into the last-mentioned chamber, and enough pneumatic pressure is preferably permitted to remain on the digested mass within the digester during the evacuation of the digester to facilitate the passage of the digested mass into the drier.

The valve 86 of the pipe 85 is opened upon opening the slide-valves V and $v$ preparatory to the discharge of the cooked or digested mass from the digester into the drying-chamber, so as to establish communication during the evacuation of the digester between the drying-chamber and the chamber $a$ of the digester at the top of the said chambers, and thereby permit a gradual equalizing of air-pressures within the said chambers; but of course the valve 86 is kept closed during the operation of the drier as well as during the cooking or digesting of the material within the aforesaid chamber of the digester.

In treating garbage and sewage I prefer not to remove the liberated grease from the mass in the digester, but to permit all oily and greasy matter to pass with the remainder of the mass into the drying-chamber 55, wherein the grease is absorbed by or adheres to the fertilizer-forming particles of the digested mass. The digested mass having passed into the drying-chamber is dried in the said chamber in any approved manner and is stirred by the operation of the shaft $s$ during the drying period to facilitate the drying process and to thoroughly and uniformly distribute the grease throughout the mass, so as to facilitate the subsequent separation of the grease from the remainder of the mass by percolation. Upon the passage of the digested material from within the digester into the drying-chamber 55 the valves V and $v$ are closed to prevent any vapor or gases arising within the drying-chamber during the drying period from ascending into the digester. During the drying period the material is rendered substantially non-aqueous, and the aqueous vapors arising from the mass within the drier are conducted off at the vapor-outlet 77 of the drying-chamber. The passage of aqueous vapor from the drying-chamber is facilitated by the operation of the suction-creating device 82.

When the digested mass has been rendered substantially non-aqueous within the drying-chamber, the substantially non-aqueous and grease-bearing digested material is removed from the drying-chamber through the discharge-outlet 75 of the said chamber upon opening the door 76 and is conveyed to and placed in a percolator wherein the said material is treated with a solvent—such, for instance, as naphtha—to separate the grease from the fertilizer-forming remaining particles of the mass.

A percolator is illustrated in Fig. 3 of the drawings, and referring to this figure, M indicates the normally closed cylindrical tank or receptacle of the percolator. The receptacle M is provided at the top and at one side with a charging-aperture 15, at which the oil-yieldable material removed from the drier is introduced into the said receptacle. The aperture 15 is normally closed by a cover 16. The receptacle M is provided at the bottom and one side with a doorway M', through which the residue remaining in the percolator after the extraction of oil from oil-yieldable material placed in the percolator is removed, which doorway M' is normally closed by a suitably-applied door $m'$. The receptacle M is provided externally with a heating-jacket $M^2$. A valved pipe $m^2$ is arranged to supply steam or other heating fluid to the chamber of the jacket $M^2$ and has its valve $m^3$ normally closed. A valved drain-pipe $M^4$ extends from the lower end of the jacket and has its valve $m^4$ normally closed. A pipe $e$ for supplying the naphtha or solvent to the chamber of the receptacle M is arranged to discharge into the said chamber and has a valve $e'$, which is normally closed. A drain-pipe E is arranged to conduct oil which has been extracted within the receptacle M from the said receptacle. The pipe E is provided with a valve $E'$, which is normally closed. The pipe E extends downwardly from the bottom of the receptacle, and an upwardly-bulging concavo-convex screen or strainer $E^2$ extends over the oil-receiving end of the pipe E. A shaft $k$ is arranged vertically or centrally of the receptacle M and extends from above and near the screen upwardly and through and a suitable distance above the top of the receptacle M. A bevel-gear $k'$ is operatively mounted on the shaft $k$ a suitable distance above the top of the receptacle M. The gear $k'$ rests upon the upper end of a vertically-arranged tubular guide and shaft-steadying piece $o$, which is rigid with the top of the receptacle M and loosely embraces the shaft $k$, and antifriction-balls $o'$ are interposed between the lower end of the gear $k'$ and the upper end of the member $o$. The shaft $k$ next above the gear $k'$ is provided with a collar $k^2$, which rests upon the said gear. A shaft-steadying frame $z$, mounted upon and secured to the bottom of the receptacle M and arranged over the screen $E^2$, loosely embraces and is adapted to steady the shaft $k$. The gear $k'$ meshes with the bevel-pinion $K'$, operatively mounted on a suitably-applied shaft K, to which power is applied in any approved manner. The shaft $k$ is provided within the receptacle M with two sets of laterally-projecting and radially-arranged stirring-arms, with the arms $k^3$ of one of the sets of arms alternating with the arms $k^4$ of the other set of arms. The receptacle M is provided at its upper end with a vapor-conducting pipe $M^5$, which has a suitably-operated pump or device $m^5$, adapted when operating to create suction, and thereby establish a partial vacuum in the vapor-outlet $M^5$, and consequently in the chamber of the receptacle M upon opening the normally closed valve $M^6$, with which the pipe $M^5$ is provided between the said receptacle and the receiving end of the suction-creating device.

In operating the percolator the oil-yieldable material removed from the drier is supplied to the chamber of the receptacle M, and the valve $e'$ of the solvent-supply pipe $e$ is opened to run the desired quantity of solvent into the said receptacle and closed as soon as the said receptacle has been supplied with the desired quantity of solvent. The oil-yieldable material is treated with the solvent at the ordinary atmospheric temperature, and during the said treatment the shaft $k$ is rotated so as to cause its arms to stir and disintegrate the mass, and thereby facilitate the extraction of the oil. When the oil has been extracted, the valve $E'$ of a drain-pipe E is opened to permit the extracted oil to run from within the receptacle M through the said pipe. The shaft $k$ is operated to revolve its arms $k^3$ and $k^4$ during the draining period, so as to stir or disintegrate the mass and facilitate the flow of oil to the pipe E. When the extracted oil and solvent mixed therewith has been drained from the material, the valve E is closed and the valve $m^3$ of the pipe $m^2$ is opened to permit the flow of heating agent into the chamber of the jacket, so as to heat the receptacle M. Traces of naphtha or volatile solvent remaining with the residue within the receptacle vaporize and escape at the top of the receptacle through the pipe $M^5$ upon opening the valve $M^6$, and the pump or suction-creating device $m^5$ is operated to create a partial vacuum within the upper portion of the receptacle, and thereby draw or pull the vaporized solvent or gases and moisture from the mass through the said pipe, and the shaft $k$ is operated during the vaporizing period to stir the mass of material undergoing treatment and facilitate an equal distribution of the heat throughout the mass and facilitate the escape of gases, vapors, and moisture from the mass. The residue remaining in the receptacle M is removed through the doorway M' upon opening the door $m'$.

Portions of the apparatus shown and described in this application are disclosed and claimed in a contemporaneous application bearing Serial No. 210,197, filed May 28, 1904.

What I claim is—

1. A process of reducing garbage and sewage, consisting in cooking or digesting the material within a closed steam-heated chamber for a period long enough and at a temperature high enough to thoroughly disintegrate the material and render the grease readily separable from the remainder of the mass by percolation, with the mass, during the said disintegration of the material, under a pneumatic pressure high enough to prevent vapors carrying more or less ammonia from ascending or separating from the material and to prevent vaporizing of glycerin; then drying the digested material to render the mass substantially non-aqueous and stirring the mass during the drying period to distribute the grease throughout the mass, and then treating the dried digested and substantially non-aqueous mass with a solvent.

2. A process of reducing garbage and sewage, comprising a cooking or digesting of the material within a closed chamber, and placing on the mass in the said chamber, preparatory to the cooking or digesting of the mass, a pneumatic pressure high enough to prevent vapors carrying more or less ammonia from ascending or separating from the nitrogenous material and to prevent vaporizing of glycerin during the cooking or digesting of the material, and uninterruptedly maintaining the said pneumatic pressure on the mass during the cooking or digesting of the material.

3. A process of reducing garbage and sewage, consisting in cooking or digesting the material within a closed chamber for a period long enough and at a temperature high enough to thoroughly disintegrate the material and render the grease readily separable from the remainder of the mass by percolation, with the mass during the disintegration of the material under a pneumatic pressure high enough to prevent the liberation and ascent of ammonia-carrying vapors, then drying the digested material to render the mass substantially non-aqueous, and then treating the dried digested and substantially non-aqueous mass with a solvent.

4. A process of reducing garbage and sewage comprising a cooking or digesting of the material within a closed chamber at a temperature above 285° Fahrenheit and under a pneumatic pressure of from seventy-five to eighty pounds per square inch; then drying the digested material to render the mass substantially non-aqueous, and then treating the dried digested and substantially non-aqueous mass with a solvent.

In testimony whereof I sign the foregoing specification in the presence of two witnesses.

EUGENE RILEY EDSON.

Witnesses:
C. H. DORER,
G. M. HAYES.